United States Patent [19]

Bruggemann et al.

[11] Patent Number: 5,333,775
[45] Date of Patent: Aug. 2, 1994

[54] HYDROFORMING OF COMPOUND TUBES

[75] Inventors: Charles J. Bruggemann, Rochester Hills; Michael G. Poss, St. Clair Shores; Sanjay M. Shah, Rochester Hills, all of Mich.

[73] Assignee: General Motors Corporation, Detroit, Mich.

[21] Appl. No.: 49,693

[22] Filed: Apr. 16, 1993

[51] Int. Cl.⁵ .......................................... B23K 31/02
[52] U.S. Cl. .................................... 228/157; 228/155; 72/61
[58] Field of Search ........................ 228/155, 156, 157; 72/260, 61

[56] References Cited

U.S. PATENT DOCUMENTS

| | | | |
|---|---|---|---|
| 3,725,997 | 4/1973 | Kiwalle et al. | 228/125 |
| 3,729,124 | 4/1973 | Kedzior et al. | 228/125 |
| 4,559,832 | 12/1985 | Burlage et al. | 73/861.24 |
| 4,759,111 | 7/1988 | Cudini | 29/523 |
| 4,827,100 | 5/1989 | Frings et al. | 219/121.64 |
| 5,070,717 | 12/1991 | Boyd et al. | 72/55 |

FOREIGN PATENT DOCUMENTS

| | | | |
|---|---|---|---|
| 693999 | 9/1964 | Canada | 72/260 |
| 465747 | 1/1992 | European Pat. Off. | 72/260 |
| 2738179 | 3/1979 | Fed. Rep. of Germany | 228/157 |

Primary Examiner—P. Austin Bradley
Assistant Examiner—Jeffrey T. Knapp
Attorney, Agent, or Firm—Kevin M. Hinman

[57] ABSTRACT

This invention teaches a method for producing a tubular structural member which can longitudinally vary in wall thickness, perimeter and material using the hydroforming process. This is accomplished by first fabricating a tube blank of the desired longitudinal combination of wall thickness, perimeter and material by welding together portions of tubing having the desired characteristics and then hydroforming the resultant blank. The hydroformed part will have nearly the same thickness, perimeter and material characteristics as the blank in the corresponding longitudinal location.

4 Claims, 4 Drawing Sheets

HYDROFORMING OF COMPOUND TUBES

TECHNICAL FIELD

This invention relates to the forming of a tubular structural member by internal pressurization of the member in a shape controlling die.

BACKGROUND OF THE INVENTION

Hydroforming, the use of fluid pressure to expand a tube or tube blank to comply with the shape of an enclosing die, is effective at providing tubular parts with a cross-sectional shape varying along their longitudinal axes. The cross-sectional shape of the resultant structural member is often appreciably different from the cross-sectional shape of the tube blank. Box shaped cross sections are commonly formed from cylindrical tube blanks. These cross-sectional shapes, however, will have a nearly constant wall thickness when the perimeter remains fairly constant along the length of the resultant structural member.

Conventional hydroforming, where the forming is essentially limited to pressurizing the tube blank to force it to conform to an enclosing die, produces little change in the length of a part. The length of the formed part is essentially equal to the length of the tube blank. For this reason, the cross-sectional area of the formed tube wall tends to remain constant along its length, equalling that of the tube blank. The constant area means that there is generally a tradeoff made between section perimeter and the local wall thickness. Hydroforming will generally increase perimeter and decrease wall thickness. It is appreciated that a variant form of hydroforming called bulge forming produces parts shorter than the tube blank to provide an increase in perimeter with little or no associated decrease in wall thickness. However, bulge forming requires a longitudinal loading of the blank simultaneous with the pressurization of the blank.

Permissible perimeter expansion of the tubing with conventional hydroforming is limited by the ductility of the tube material. More ductile material can sustain a greater amount of expansion.

It is often highly desirable to produce parts having wall perimeters and/or wall thicknesses which vary locally along the length of the formed part by more than the amount available with convention hydroforming, such as a tubular member with a localized 100 percent increase in wall thickness, or with a localized increase in perimeter of 100 percent. Unfortunately, conventional hydroforming does not readily lend itself to providing a part with such localized variations.

One approach to using conventional hydroforming to provide parts satisfying longitudinally varying thickness and perimeter requirements is to let the maximum perimeter and thickness dimensions control the dimensions of the tube blank for its entire length. Localized perimeter reductions are achieved by folding any excess tube perimeter into a flange on a side of the formed part. Letting the maximum dimensions control the tube blank dimensions, however, has an associated mass penalty because the resultant parts are heavier than they need to be.

Another approach is to hydroform the part in small sections from a variety of tube blanks having the locally desired characteristics, and then to weld the smaller hydroformed parts together. However, this carries a tooling cost penalty, as more die sets are required than if the final part is formed from a single blank in a single die set.

An alternative approach to providing locally thicker sections in the structural member is to use a tube of some nominal thickness to provide a base thickness, and use sleeves over the tube at those locations requiring a greater thickness to provide localized thickness increases. The sleeves are first placed over the tube blank. The tube and sleeves are placed in the die together for forming. Special fixturing is used to position the sleeves to axial positions on the tube. The expansion of the tube around the sleeve consumes a significant portion of the available amount of expansion of the tube, as the tube proximate to ends of the sleeve will be expanded to an outer perimeter approximately equal to that of the outer perimeter of the surrounding sleeve.

SUMMARY OF THE INVENTION

The present invention overcomes the above mentioned limitations of conventional hydroforming techniques in providing structural metabets varying substantially in perimeter and thickness in the longitudinal direction. The limitations are overcome by forming tube blanks which have the desired longitudinal perimeter and thickness characteristics of the structural member to be hydroformed.

Providing a single tube blank by welding together tubes of different diameters and thicknesses makes it possible to hydroform parts having localized longitudinal thickness variations and perimeter changes from a single tube blank in a single forming operation with a single die. This offers significant cost savings over forming several small sections and then welding because only one die set is required.

A tubular structural member may also be provided with a localized variance in strength characteristics by including a section of a desired variant material at a desired longitudinal location in the tube blank. The tubular structural member can also be provided with localized variations in material coatings appropriate to the intended usage of the member.

It is an object of this invention to provide an improved method of forming a tubular structural member comprising the steps of: forming a first tube having a first diameter and a first wall thickness, forming a second tube having a second diameter and a second wall thickness, welding the first tube to the second tube to form a tube blank, enclosing the tube blank in a die having cooperating die sections defining a longitudinal cavity, and hydraulically pressurizing the tube blank, thereby forcing the tube blank to conform to the longitudinal cavity of the die.

This and other objects and advantages of the invention will be more apparent from the following description and drawings.

DESCRIPTION OF THE PREFERRED EMBODIMENT

Figure 3:
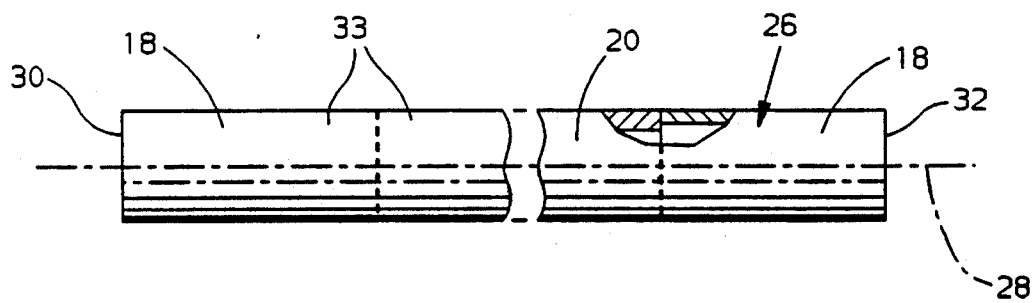
FIG. 3 shows the tube blank of FIG. 2 with the weld metal removed from the outside of the tube blank.
Figure 4:
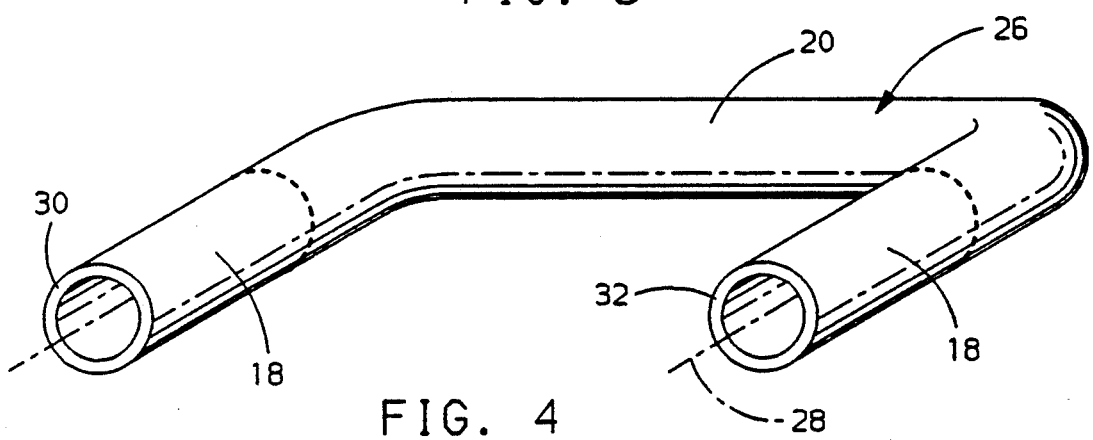
FIG. 4 shows the tube blank of FIG. 3 after being bent.
Figure 5:
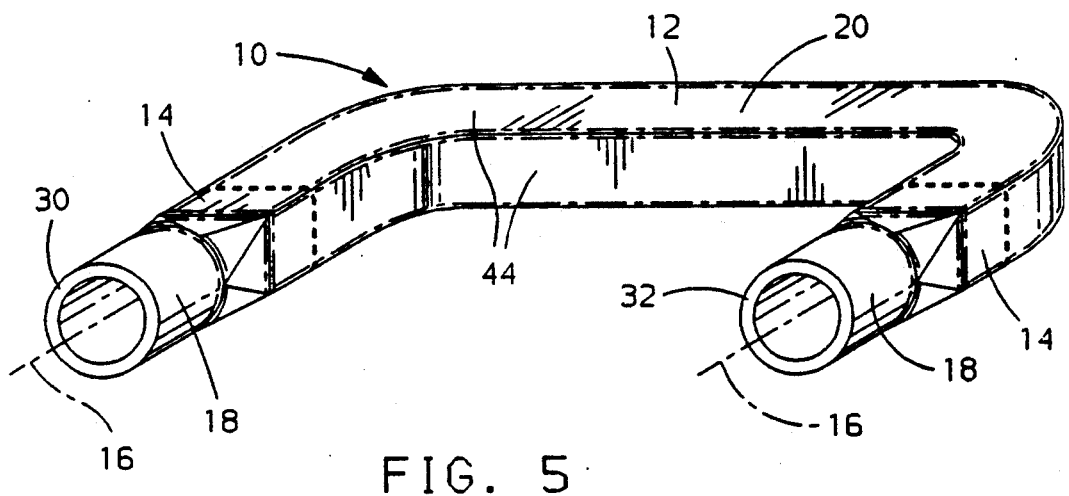
FIG. 5 shows a tubular structural member formed from the tube blank in FIG. 4.
Figure 6:
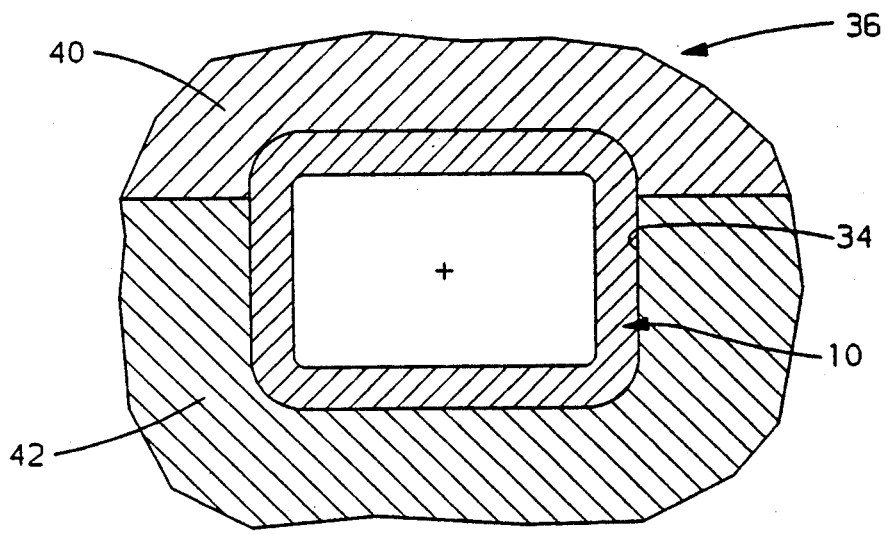
FIG. 6 shows a sectional view of the tubular structural member of FIG. 5 disposed in a die cavity.
Figure 7:
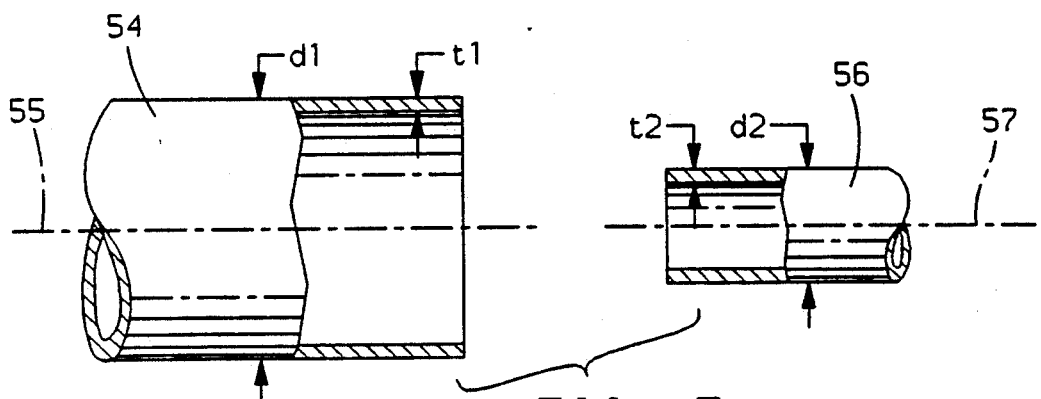
FIG. 7 shows two pieces of cylindrical tubing of different diameters.

FIGS. 1-6 illustrate the forming of a U-shaped tubular structural member 10, shown in completed form in FIG. 5, having a midsection 12 with a wall thickness greater than that of two end portions 14. The formed structural member 10 has a generally box shaped cross section along most of a longitudinal axis 16.

Figure 1:
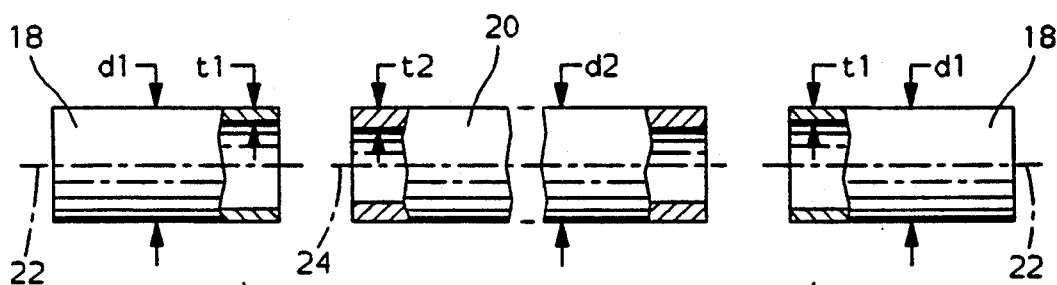
FIG. 1 shows three pieces of cylindrical tubing of two different wall thicknesses.
Figure 2:
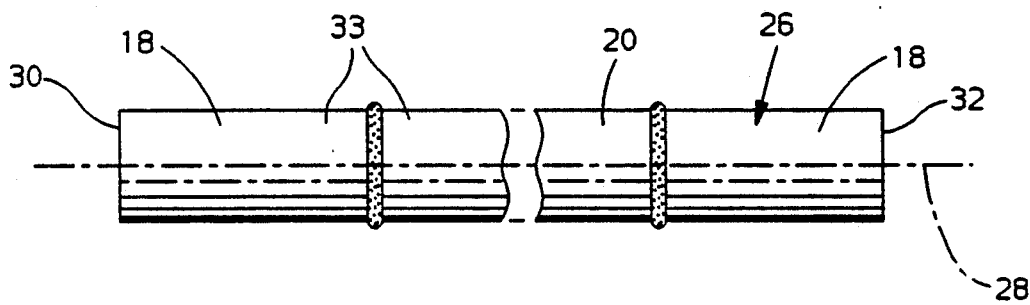
FIG. 2 shows the three pieces in FIG. 1 welded together into a single tube blank.

The process begins with the forming of first and second tubes 18, 20 shown in FIG. 1. Two first cylindrical seamed tubes 18 with longitudinal axes 22 and having wall thickness t1 and diameter d1 are formed from a suitable material such as SAE 1010 steel. The wall thickness t1 is selected to provide the minimum required wall thickness of the end portions 14, allowing for anticipated thinning during forming. The diameter d1 is selected to provide the desired perimeter of the formed end portions 14, allowing for the available perimeter expansion associated with the material chosen here.

A second cylindrical seamed tube 20 with a longitudinal axis 24 and having wall thickness t2 and diameter d2 is formed from a suitable material such as SAE 1010 steel. The wall thickness t2 is selected to provide the minimum required wall thickness of the midsection 12, allowing for anticipated thinning during forming. The diameter d2 is selected to provide the resultant perimeter of the formed midsection 12 allowing for the available perimeter expansion. In this embodiment, d1 equals d2, and t2 is greater than t1.

One of the first tubes 18 is placed end to end with the second tube 20 with their longitudinal axes 22, 24 aligned to coincide. The tubes 18, 20 are laser welded together, providing a sealed connection. The remaining first tube 18 is similarly welded to the other end of the second tube 20. These three tubes 18, 20, 18 together form a tube blank 26, seen in FIG. 2. The longitudinal axes of the three tubes define a longitudinal axis 28 of the tube blank 26. The longitudinal axis 28 of the tube blank 26 passes through a first open end 30 and a second open end 32 of the tube blank 26. This compound tube blank 26 with wall thickness t2 in just the second tube 20 is appreciably lighter than a tube blank of thickness t2 over its entire length.

After welding, excess weld metal on an outside surface 33 of the tube blank 26 is removed to smooth the outside surface 33. A smoothed tube blank 26 is shown in FIG. 3. This smoothing prevents the walls from bending around the weld during hydroforming.

The tube blank 26 is then bent along its longitudinal axis 28 by conventional means to a U-shape common with a U-shape of a longitudinal cavity 34 of a die 36 in which the blank 26 will be placed. The bent tube blank 26 is shown in FIG. 4. Mandrel bending is the preferred bending means in the present invention. Another advantage of having a single integral tube blank 26 is readily apparent here. The integral tube blank 26 does not require special fixturing to position reinforcing sleeves during bending.

The bent blank 26 is then positioned in a hydroforming machine between a first die section 40 and a cooperating second die section 42 of the die 36. These cooperating die sections 40, 42, when pressed together, define the longitudinal cavity 34. The open ends 30, 32 of the bent blank 26 are engaged and sealed by the hydroforming machine. The bent tube blank 26 is filled with hydraulic fluid through the open ends 30, 32 by the hydroforming machine. The cooperating die sections 40, 42 are pressed together to enclose the bent blank 26 in the die 36. Some deformation of the bent blank 26 may occur as it is forced into the die cavity 34 when the die sections 40, 42 are pressed together.

Forming pressurization of the fluid in the tube blank 26 to approximately 9000 pounds per square inch is initiated after the die 36 has been closed. The pressure forces the tube blank 26 to yieldingly comply with the die cavity 34, thereby producing the desired tubular structural member 10. The structural member 10 is then depressurized and drained of hydraulic fluid. The die sections 40, 42 are separated, releasing the tubular structural member 10 for removal from the die 36. Hydroforming equipment suitable for use in this operation is described in U.S. patent application Ser. Nos. 07/890,189 and 07/881,275, assigned to the assignee of the present invention.

The resultant U-shaped tubular structural member 10 has an outer surface 44 continuous along its length with an appreciably greater wall thickness in its midsection 12 than in its ends portions 14.

An alternative embodiment of the invention, shown in FIGS. 7-13, illustrates how to provide a hydroformed structural member 50 with a varying perimeter. Welding together tubes of different diameters to provide a tube blank 52 with a diameter which varies in the longitudinal direction makes it possible to achieve substantial changes in perimeter in a hydroformed structural member using just one hydroforming operation.

A tube blank 52 is built up by welding a first tube 54 having a diameter d1 and wall thickness t1 and a longitudinal axis 55 end to end with a second tube 56 having a diameter d2 and wall thickness t2 and a longitudinal axis 57 where d2 is less than d1, and t1 cannot be butted up against one another for welding because d1 differs from d2 by more than twice wall thickness t1. Several options for joining the tubes 54, 56 are presented in FIGS. 8-11 and described below.

Figure 8:
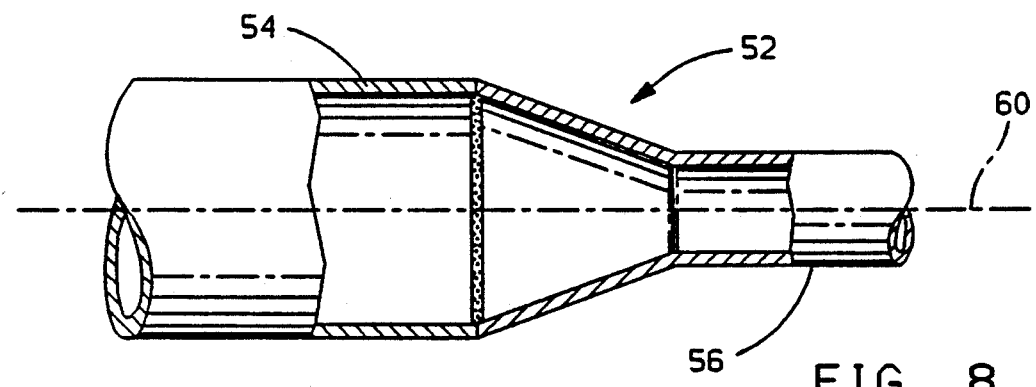
FIG. 8 shows a first alternative approach to joining the tubes in FIG. 7 into a single tube blank.

An end of the second tube 56 is flared out to diameter d1 as shown in FIG. 8.

Figure 9:
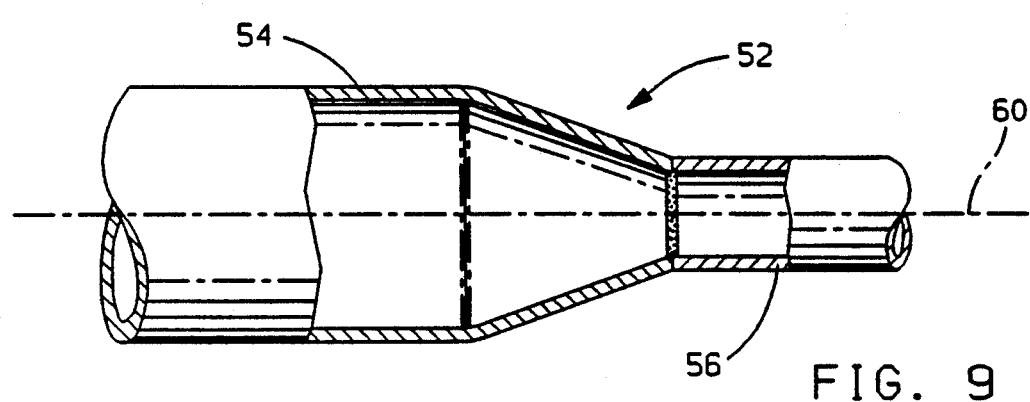
FIG. 9 shows a second alternative approach to joining the tubes in FIG. 7 into a single tube blank.

An end of the first tube 54 is tapered down to diameter d2 as shown in FIG. 9.

Figure 10:
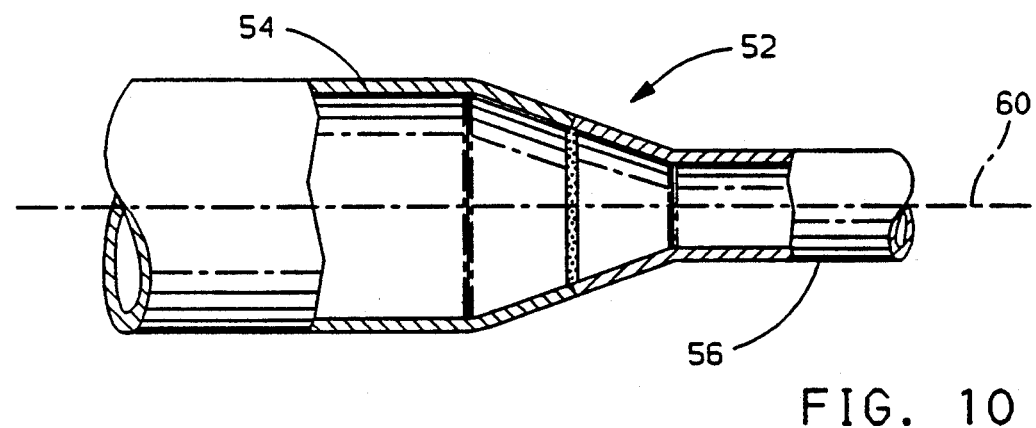
FIG. 10 shows a third alternative approach to joining the tubes in FIG. 7 into a single tube blank.

An end of the second tube 56 is flared out and an end of the first tube 54 is tapered down to some intermediate diameter between d1 and d2 as shown in FIG. 10.

Figure 11:
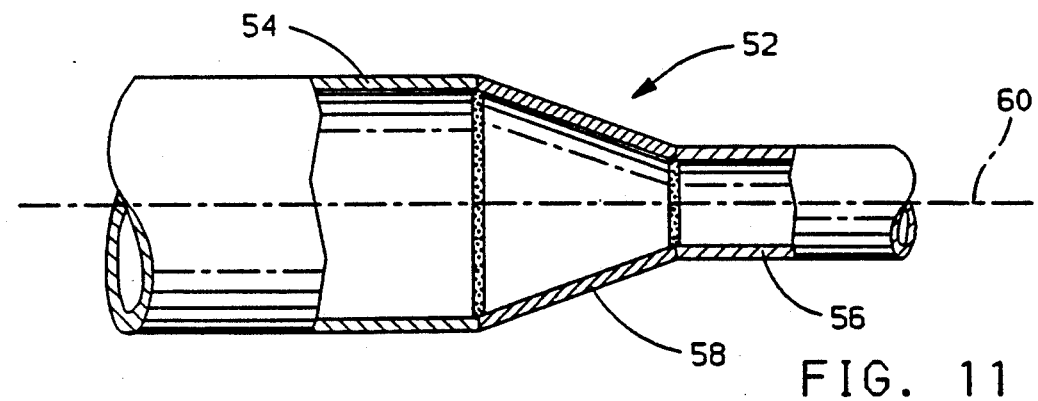
FIG. 11 shows a fourth alternative approach to joining the tubes in FIG. 7 into a single tube blank.
Figure 12:
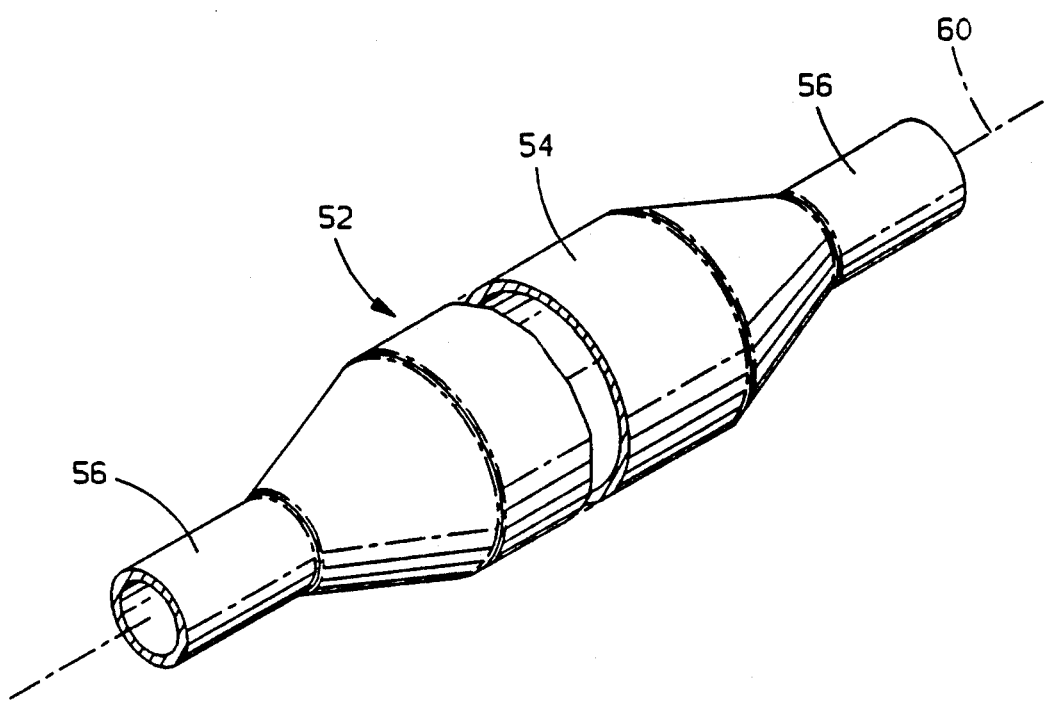
FIG. 12 shows a perspective view of the tube blank formed from the tubes in FIG. 7.
Figure 13:
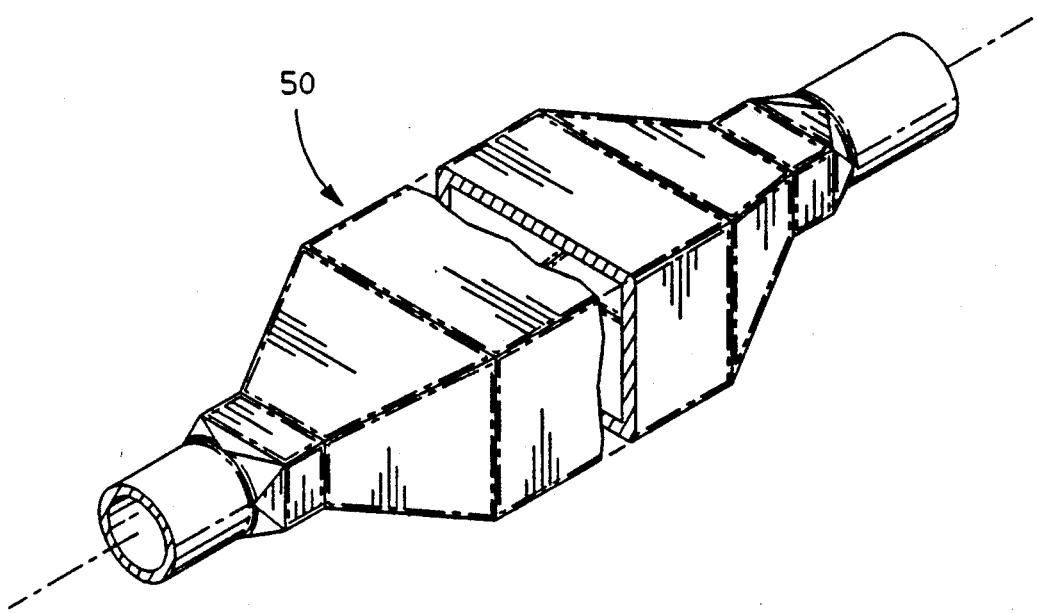
FIG. 13 shows a perspective view of a tubular structural member formed from the tube blank in FIG. 12.

A transition tube 58 with a diameter d1 at one end and a diameter d2 at a second end disposed between the first and second tubes 54, 56 as shown in FIG. 11.

The flaring and tapering is accomplished using conventional tube forming means, such a tube expanders.

Another second tube 56 is similarly welded to a remaining end of the first tube 54 to form the tube blank 52.

The tube blank 52 is then hydroformed in conformance with the previously described procedure for forming tubular structural members with differing thicknesses. It is appreciated that a cavity in a die into which the blank 52 is to be placed will have a corresponding transition in perimeter to that of the tube blank 52 so that the expansion of the perimeter is limited to approximately five percent in any one location along a longitudinal axis 60 of the blank 52.

It should be noted that the axes 55, 57 of the tubes 54, 56 need not coincide before joining them. This facilitates forming a structural member with a large perimeter portion axially offset from a small perimeter portion.

It may also be desirable for some tubular structure members to have a localized longitudinal variation in material. The present invention accommodates this. A first tube of a first material can be welded to a second tube of the second material to form a tube blank with a longitudinal variation in material in the formed structural member. It is appreciated that the materials to be used in a tube blank must be compatible with each other for welding. Examples of different types of materials which can be combined are high strength low alloy steel, galvanized steel, and plain carbon steel.

Obviously, many modifications and variations of the present invention are possible in view of the above teachings. Readily apparent variations include the forming of a tube blank with both wall thickness and perimeter variations, and forming a tube blank having both perimeter variations and material variations. Another potential variation is to expand the perimeter over the recommended amount of five percent in the hydroforming operation. Also, the blanks could be formed without removing weld metal. Further, other ductile metals besides steel, such as aluminum and magnesium, can be hydroformed in accordance with this invention. The tubes used to form the blank can have different coatings. Pressures used to form parts will vary with material thickness and the required part definitions. The above teachings are not intended to limit the scope of this invention. It is therefore to be understood, that within the scope of the appended claims, the invention may be practiced otherwise than as specifically described.

The embodiments of the invention in which an exclusive property or privilege is claimed are defined as follows:

1. A method of making a tubular structural member having a selectively localized longitudinal variation in at least one of a wall thickness and a perimeter comprising the steps of:
   forming a first tube having a first diameter and a first wall thickness and a longitudinal axis;
   forming a second tube having a second diameter and a second wall thickness and a longitudinal axis;
   at least one of the first diameter and the first wall thickness being different from the corresponding one of the second diameter and the second wall thickness,
   welding the first tube to the second tube to form a longitudinal tube blank having a longitudinal axis passing through a first end and a second end of the tube blank;
   enclosing the tube blank in a die having cooperating die sections defining a longitudinal cavity; and
   hydraulically pressurizing the tube blank from inside thereof thereby forcing the tube blank radially outward relative to the longitudinal axis of the tube blank into conformance with the longitudinal cavity of the die.

2. A method of providing a tubular structural member as described in claim 1, further comprising the step of:
   smoothing an outside surface of the tube blank where the first tube has been welded to the second tube before enclosing the tube blank in the die.

3. A method of providing a tubular structural member as described in claim 1 with the difference in shape between the first and second tubes being due to the tubes having different wall thicknesses.

4. A method of providing a tubular structural member as described in claim 1 with the difference in shape between the first and second tubes being due to the tubes having different diameters.

* * * * *